No. 744,394.	Patented November 17, 1903.

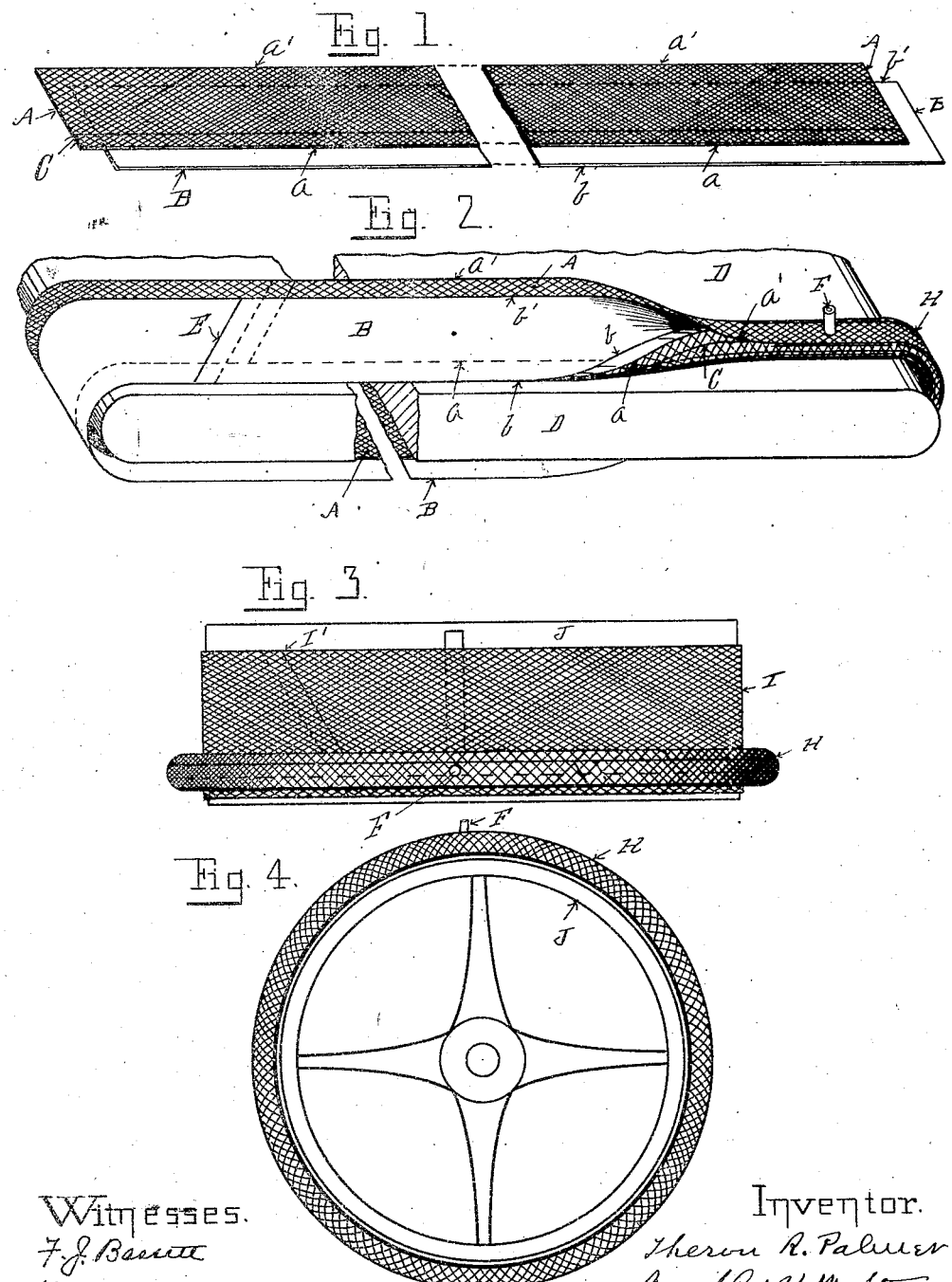

UNITED STATES PATENT OFFICE.

THERON R. PALMER, OF JEANNETTE, PENNSYLVANIA.

PROCESS OF MAKING SINGLE-TUBE PNEUMATIC TIRES.

SPECIFICATION forming part of Letters Patent No. 744,394, dated November 17, 1903.

Application filed June 11, 1903. Serial No. 161,027. (No model.)

*To all whom it may concern:*

Be it known that I, THERON R. PALMER, a citizen of the United States, residing at Jeannette, in the county of Westmoreland and State of Pennsylvania, have invented certain new and useful Improvements in Processes of Making Single-Tube Pneumatic Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in the process of making single-tube or hose-pipe pneumatic tires, and has for its objects the production of continuous annular pneumatic tires from the constituent elements thereof—viz., canvas and sheet-rubber—in such a manner that I am enabled to use a much thinner sheet of rubber to form the inner lining or air-tube than is now used in the construction of such tires and at the same time to overcome the liability of air-bubbles forming between the inner lining or air-tube and the canvas layer of the tire surrounding it during the vulcanization of the tire, and thereby causing leaks therein, which difficulty is a serious one in the manufacture of tires on account of the losses caused by defective tires caused thereby.

Other advantages of my invention consist in the manipulation of the material being formed into a tire so as to greatly simplify and reduce the labor of making a continuous annular tire without the usual splice to join the ends of the tire after it is made into a hose-like form and entirely avoiding the use of mandrels and other appliances in forming up the tire.

The features of my invention are hereinafter set forth and described, and illustrated in the accompanying drawings, in which—

Figure 1 illustrates a strip of frictioned canvas with a strip of thin rubber lining ready to be made into an inner tube or tire-lining. Fig. 2 illustrates the forming up of this strip into a tube. Fig. 3 illustrates a top or plan view of this tube inflated and being covered with the remaining layers of frictioned canvas and rubber necessary to complete the tire ready for vulcanization. Fig. 4 illustrates a side view of same in elevation during the same process.

In the practice of my invention I first take suitable canvas frictioned with rubber on both sides and cut it diagonally into strips of the proper width to form the tube and join such strips by overlapping the ends thereof until I have formed a strip of such cloth of sufficient length to form a tire. I then cut a strip of thin sheet-rubber of the same width and length and lay said strip of frictioned canvas and the strip of rubber together with one end and one edge of the canvas extending somewhat beyond the end and side of the strip of rubber, as illustrated by the strip of canvas A and strip of rubber B in Fig. 1. I then pass this composite strip of canvas and rubber between calender-rolls, so as to firmly unite them and drive out all air which might possibly be between them. I then draw a line C (see Fig. 1) along the side *a* of the canvas strip A, beyond which the rubber strip B projects, so as to form a guide for overlapping the opposite edge of the canvas strip thereon when the edges are folded together, as illustrated in Fig. 2. I then place this strip of canvas and rubber around a suitable projecting table D, with the rubber face thereof uppermost, and bring the ends thereof around and join them together by overlapping them, so as to form a splice E between them. After this splice E has been pressed together, so as to adhere firmly, I insert a valve-stem F through this strip near one edge thereof in the usual manner. I then soapstone the central part of the rubber face of this strip to prevent adherence when folded over, as illustrated in Fig. 2, and I then proceed to fold the edges of the strip together, bringing the opposite edge *a'* of the canvas over the edge *a* thereof to the guide-line C thereon, which brings the projecting edge *b* of the rubber under the edge *b'* thereof, so as to form an overlapping joint therewith, as illustrated in Fig. 2, and firmly press or roll down the joints so formed until the entire strip is formed into an annular tube H. I then take this tube so formed and inflate it until it assumes the form illustrated in Figs. 3 and 4, and having prepared the additional strip of frictioned canvas and rubber I, necessary to complete the tire, I place them around a suitable-sized drum or cylinder J and bring the ends thereof together and join them by overlapping and pressing the splice I' formed thereby firmly together. I then place the inflated tube H around the cylinder at one edge of the canvas thereon and roll the tube and the canvas and rubber cover firmly together by rolling the tube longitudinally over the drum until the layers of frictioned canvas and rubber are completely rolled around the tube and the tire complete ready for vulcanization.

I have hereinbefore described as a part of my process the joining of the ends of the composite strip of canvas and rubber together so as to form an annular band or ring thereof before I proceed to form the same up into a tube. It is obvious, however, that I can, if I desire, form up the greater part of the strip into a tube before splicing the ends of the strip together and then complete the forming up of the remainder thereof into tubular form, so as to complete it into an annular tube, without departing from the spirit of my invention.

Having thus described my invention, so as to enable others to utilize and practice the same, what I claim as new, and desire to secure by Letters Patent of the United States, is—

A process of making single-tube pneumatic tires, consisting substantially of imposing one strip of canvas, frictioned on both sides and of sufficient width and length to form the outside layer of the inner tube of the tire, upon a strip of sheet-rubber, of like width and length as said strip of canvas, so as to project over said rubber strip at one end and one edge thereof, uniting said strip of canvas and rubber together without leaving any air between them, securing the valve-stem therein, and folding the opposite edges of said composite strip over together and joining their edges and ends so as to form said composite strip into an annular tube, and then inflating the annular tube so formed and rolling the outer layers of the tire thereon, substantially as set forth.

In testimony whereof I affix my signature in presence of two witnesses.

THERON R. PALMER.

Witnesses:
B. W. CALDWELL,
HENRY A. RUHE.